(12) United States Patent
Gut et al.

(10) Patent No.: US 10,675,747 B2
(45) Date of Patent: Jun. 9, 2020

(54) CONTROL METHOD FOR A HAND-HELD POWER TOOL

(71) Applicant: Hilti Aktiengesellschaft, Schaan (LI)

(72) Inventors: Manuel Gut, Feldkirch (AT); Roland Schaer, Grabs (CH); Michael Wierer, Bludenz (AT); Thomas Kinkeldei, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 331 days.

(21) Appl. No.: 15/528,280

(22) PCT Filed: Nov. 17, 2015

(86) PCT No.: PCT/EP2015/076783
§ 371 (c)(1),
(2) Date: May 19, 2017

(87) PCT Pub. No.: WO2016/079096
PCT Pub. Date: May 26, 2016

(65) Prior Publication Data
US 2017/0348844 A1  Dec. 7, 2017

(30) Foreign Application Priority Data
Nov. 20, 2014  (EP) .................................... 14194080

(51) Int. Cl.
*B25F 5/00*  (2006.01)
*B25D 16/00*  (2006.01)
(Continued)

(52) U.S. Cl.
CPC .......... *B25F 5/025* (2013.01); *B23Q 11/0092* (2013.01); *B25D 16/00* (2013.01); *B25F 5/00* (2013.01); *B25D 2250/221* (2013.01)

(58) Field of Classification Search
CPC .... B25F 5/00; B25F 5/02; B25F 5/025; B25F 5/026; B25D 2250/221; B25D 2250/205;
(Continued)

(56) References Cited

U.S. PATENT DOCUMENTS 5,401,124 A * 3/1995 Hettich .................. B23Q 11/04
173/176
5,584,619 A  12/1996 Guzzella
(Continued)

FOREIGN PATENT DOCUMENTS

| DE | 19641618 | 4/1998 |
|---|---|---|
| EP | 0666148 B1 | 8/1995 |
| EP | 1201373 | 5/2002 |

*Primary Examiner* — Luis A Gonzalez
(74) *Attorney, Agent, or Firm* — Davidson, Davidson & Kappel, LLC

(57) ABSTRACT

A control method is provided for a hand-held power tool (1), which includes a motor (5) for rotationally driving a tool holder (2) about a working axis (12), including the following steps: detecting a rotary motion of the hand-held power tool (1) about the working axis (12); detecting a rotary or pivoting motion about a transverse axis (18) extending transversely to the working axis (12); triggering a safety function for reducing the torque output of the motor (5) when the rotary motion about the working axis (12) exceeds a limiting value, and suppressing the safety function when the rotary or pivoting motion about the transverse axis (18) is greater than a threshold value.

14 Claims, 1 Drawing Sheet

(51) Int. Cl.
*B23Q 11/00* (2006.01)
*B25F 5/02* (2006.01)

(58) Field of Classification Search
CPC ...... B25D 2250/195; B25D 2216/0023; B25D 2216/0046; B25D 2216/0053; B25D 2216/0069; B23Q 11/0092; B23Q 11/0085; B23Q 11/0078
See application file for complete search history.

(56) References Cited

U.S. PATENT DOCUMENTS

| | | | |
|---|---|---|---|
| 5,914,882 A | 6/1999 | Yeghiazarians | |
| 6,111,515 A * | 8/2000 | Schaer | B25F 5/00 340/679 |
| 6,700,341 B2 * | 3/2004 | Schaer | B25F 5/00 318/432 |
| 7,055,620 B2 * | 6/2006 | Nadig | B25D 16/003 173/176 |
| 7,395,871 B2 * | 7/2008 | Carrier | B25F 5/00 173/1 |
| 7,552,781 B2 * | 6/2009 | Zhang | B23D 59/001 173/1 |
| 8,316,958 B2 * | 11/2012 | Schell | B25F 5/001 173/171 |
| 10,322,502 B2 * | 6/2019 | Wirnitzer | B25D 16/00 |
| 2004/0011632 A1 | 1/2004 | Hellmann et al. | |
| 2007/0008162 A1 | 1/2007 | Gossett et al. | |
| 2014/0196920 A1 | 7/2014 | Wirnitzer et al. | |

* cited by examiner

CONTROL METHOD FOR A HAND-HELD POWER TOOL

TECHNICAL FIELD OF THE INVENTION

The present invention relates to a control method for a hand-held power tool and a hand-held power tool.

EP0666148B1 describes a safety function, which decouples a tool holder from a motor when an uncontrolled rotary motion of the hammer drill is ascertained.

The safety function is to be reliably triggered when an uncontrolled rotary motion occurs. A triggering is undesirable during a controlled operation of the hand-held power tool, however.

SUMMARY OF THE INVENTION

The present invention provides a control method for a hand-held power tool, which includes a motor for rotationally driving a tool holder about a working axis, including the following steps: detecting a rotary motion of the hand-held power tool about the working axis; detecting a rotary or pivoting motion about a transverse axis extending transversely to the working axis; triggering a safety function for reducing the torque output of the motor when the rotary motion about the working axis exceeds a limiting value, and suppressing the safety function when the rotary or pivoting motion about the transverse axis is greater than a threshold value.

The protective device ascertains whether a purely chiseling operating mode is present. During the chiseling operating mode, rotary motions about the working axis may occur, but these are typically desirable and controlled by the user. A monitor of the protective device detects the chiseling operating mode on the basis of rotary and pivoting motions perpendicularly to the working axis.

BRIEF DESCRIPTION OF THE DRAWINGS

The following description explains the present invention on the basis of exemplary specific embodiments.

Identical or functionally identical elements are indicated by identical reference numerals in the figures, unless indicated otherwise.

DETAILED DESCRIPTION

Figure 1:
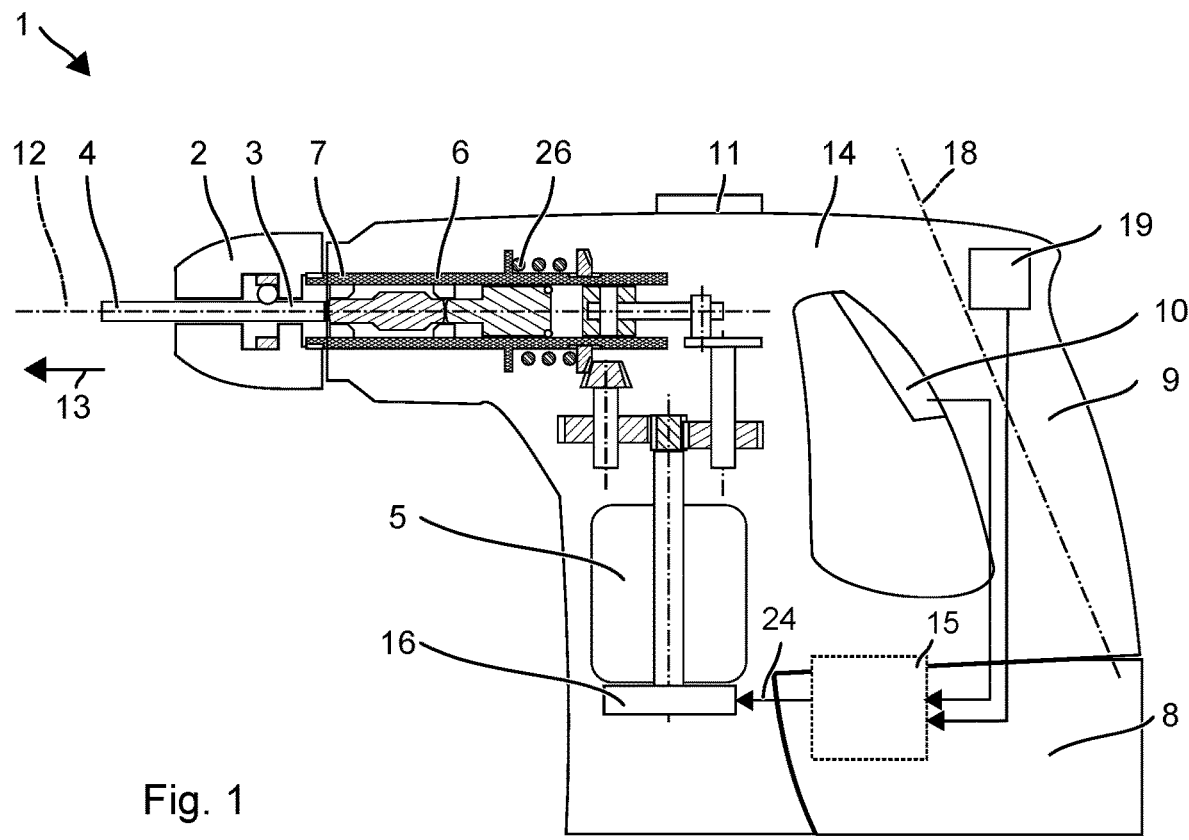
FIG. 1 shows a hammer drill.
Figure 2:
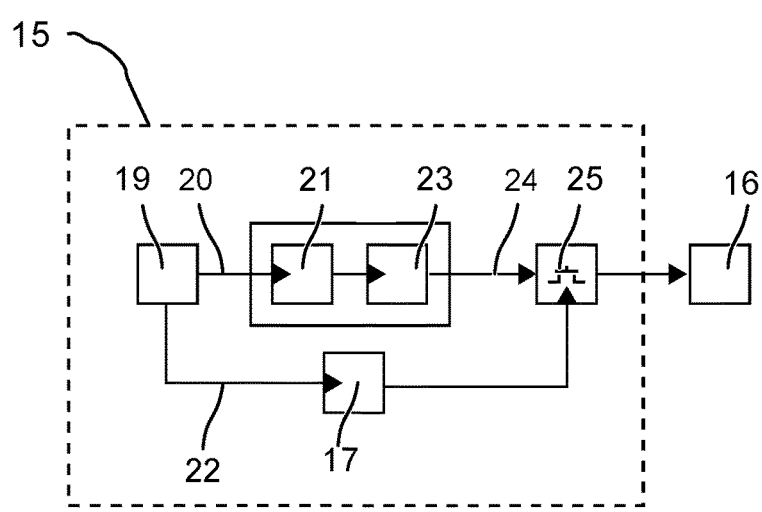
FIG. 2 shows a block diagram of a protective device controlling a brake of a motor.

FIG. 1 shows a hammer drill 1 by way of an exemplary embodiment of a hand-held power tool. Hammer drill 1 includes a tool holder 2, into which a shaft end 3 of a tool 4, e.g., a drill bit or chisel, may be inserted. A motor 5, which drives a hammer mechanism 6 and an output shaft 7, forms a primary drive of hammer drill 1. A battery pack 8 or a mains power line supplies motor 5 with current. A user may guide hammer drill 1 with the aid of a handle 9 and may start hammer drill 1 with the aid of a main switch 10. An operation selector switch 11 has at least two positions. In a "drilling position," tool holder 2 is coupled to output shaft 7; during the operation, hammer drill 1 may rotate tool 4 about working axis 12 and thereby hammer tool 4 into a substrate in direction of impact 13 along working axis 12. In a "chiseling position," tool holder 2 is decoupled from output shaft 7 and is preferably attached to a power-tool housing 14 in a rotatably fixed manner. Hammer drill 1 acts on tool 4 only percussively.

Hammer drill 1 includes a protective device 15, which protects the user against an excessive repercussive torque of a rotating tool 4. In the drilling position, hammer drill 1 exerts a repercussive torque onto the user, which results as a reaction to the torque transmitted by tool 4 onto the workpiece. Provided the substrate yields during drilling, the repercussive torque is uniform and low. In the event that tool 4 is blocked in the workpiece, a high repercussive torque results due to the abrupt slowdown of the rotating assemblies. The user is no longer able to sufficiently counteract this repercussive torque, and the entire hammer drill 1, including handle 9, therefore begins to rotate about the rotational axis of tool 4. Protective device 15 monitors a rotary motion of handle 9 relative to working axis 12 and triggers a safety function when it is expected that the instantaneous rotary motion will result in a rotation of the entire hammer drill 1 by a critical torsion angle. The safety function includes, for example, a slowdown of motor 5 with the aid of a brake 16, in order to reduce the torque applied at tool holder 2. The critical torsion angle is, for example, 60 degrees. Protective device 15 is helpful for protecting the user, during a drilling operation, against an excessive repercussion in the event that tool 4 is blocked. In the purely chiseling operating mode, a shutoff or slowdown of motor 5 is unnecessary and disruptive. A monitor 17 of protective device 15 suppresses the safety function when a purely chiseling operating mode is detected. Even if a critical torsion angle is to be expected, the safety function is not triggered and motor 5 is not slowed down. The chiseling operating mode is detected on the basis of motions about transverse axis 18. Apart from the switch-on process and during the placement of drill bit 4 into position, no greater motions about transverse axis 18 occur during drilling. The chiseling per se takes place without any motion about any of the axes. During the placement into position, the user may rotate hammer drill 1 about working axis 12, however. In this case, the user typically rotates hammer drill 1 not only about working axis 12, but also simultaneously about transverse axis 18.

Protective device 15 is activated at the latest during actuation of main switch 10. Motor 5 begins to run and starts a drilling or purely chiseling operating mode depending on the position of operation selector switch 11.

Protective device 15 receives signals from a rotary motion sensor 19. One exemplary rotary motion sensor 19 is a gyro sensor, which directly determines the angular velocity about working axis 12. The gyro sensor includes a suspended chip that oscillates, whose oscillation frequency is influenced by the Coriolis force. The gyro sensor samples the oscillation frequency, ascertains the associated angular velocity about working axis 12, and outputs a corresponding measuring signal 20. Rotary motion sensor 19 may be situated in the vicinity of working axis 12 or offset with respect to working axis 12 in power-tool housing 14 or handle 9. An evaluation unit 21 of protective device 15 processes measuring signal 20. Exemplary evaluation unit 21 estimates the future torsion angle based on the angular velocity instantaneously measured by rotary motion sensor 19 and an instantaneous torsion angle. Evaluation unit 21 may determine the instantaneous torsion angle via integration of the angular velocity. The future torsion angle is the sum of the instantaneous torsion angle and the product of the instantaneous angular velocity with a fixed period of time of, e.g., 10 ms. A comparator 23 compares the future torsion angle with the critical torsion angle and, if necessary, triggers a safety function of protective device 15. Another exemplary protective device 15 triggers the safety function when the instantaneous angular velocity exceeds a critical angular velocity. For example, protective device 15 transmits a brake signal 24 to brake 16 of motor 5, as a safety function. Motor 5 is preferably slowed down to a standstill.

Rotary motion sensor 19 additionally detects a rotary motion about a transverse axis 18 of hammer drill 1. Transverse axis 18 is, for example, parallel to handle 9 or perpendicular to the plane spanned by handle 9 and working axis 12. Exemplary rotary motion sensor 19 outputs a second measuring signal 22, which corresponds to the angular velocity about the transverse axis. Instead of a single rotary motion sensor 19, two rotary motion sensors may also determine the rotary motions about the axes extending transversely to each other.

A monitor 17 processes the rotary motion about transverse axis 18. Monitor 17 compares the angular velocity about transverse axis 18 with a threshold value. Monitor 17 identifies that the threshold value has been exceeded by way of a purely chiseling operating mode of hammer drill 1. The threshold value lies, for example, in the range between 90 degrees/s and 720 degrees/s. The threshold value may be selected as a function of the rotary motion about working axis 12 or, equivalently, a product of the angular velocities about working axis 12 and transverse axis 18 may be compared with a threshold value. When the threshold value is exceeded, monitor 17 opens a switch 25, for example, which interrupts a transmission of brake signal 24 to brake 16. Protective device 15 is therefore inactive. Protective device 15 may remain in the inactive state for a predefined period of time. Alternatively, protective device 15 is only reactivated when the user actuates main switch 10 the next time.

Brake 16 may be, for example, a mechanically acting brake, which jams motor 5. Preferably, the drive train is decoupled in this case from motor 5 with the aid of a slipping clutch 26 or an electrically activated clutch. According to one preferred embodiment, brake 16 is to be implemented together with motor 5. Motor 5 is switched into a generator mode and the generated electrical power is introduced into an ohmic resistor. Alternatively, a current may be supplied into motor 5, in particular in the case of a reluctance motor, in such a phase-controlled way that the electromechanical force counteracts the rotary motion of motor 5.

What is claimed is:

1. A control method for a hand-held power tool, the hand-held power tool having a motor for rotationally driving a tool holder about a working axis, the control method comprising:
    detecting a rotary motion of the hand-held power tool about the working axis;
    detecting a further rotary or pivoting motion about a transverse axis extending transversely to the working axis;
    triggering a safety function for reducing the torque output of the motor when the rotary motion about the working axis exceeds a limiting value, and suppressing the safety function when the further rotary or pivoting motion about the transverse axis is greater than a threshold value.

2. The control method as recited in claim 1 wherein an angular velocity of the further rotary or pivoting motion about the transverse axis is detected and the safety function is deactivated when the angular velocity exceeds the threshold value.

3. The control method as recited in claim 2 wherein the safety function activates a brake of the motor.

4. The control method as recited in claim 1 wherein the motor is started in response to an actuation of a main switch of the motor and the detecting of the rotary motion and the detecting of the further rotary motion are activated before or upon the starting of the motor.

5. The control method as recited in claim 1 wherein the rotary motion and further rotary motion are detected by a gyro sensor.

6. The control method as recited in claim 1 wherein the safety function is triggered when an instantaneous angular velocity of the hand-held power tool about the working axis exceeds a critical angular velocity.

7. The control method as recited in claim 1 wherein the motor includes a brake and further comprising transmitting a brake signal to activate the brake when the safety function is triggered.

8. The control method as recited in claim 7 further comprising interrupting the transmission of the brake signal when the further rotary or pivoting motion about the transverse axis is greater than the threshold value.

9. A hand-held power tool comprising:
    a tool holder;
    a hammer mechanism;
    a motor for rotationally driving the tool holder about a working axis and for driving the hammer mechanism;
    a rotary motion sensor detecting a rotary motion of the hand-held power tool about the working axis and a further rotational or pivot motion about a transverse axis extending transversely to the working axis; and
    a protective device triggering a safety function for reducing a torque output of the motor when the rotary motion about the working axis exceeds a limiting value, the protective device including a monitor suppressing the safety function when the further rotary or pivoting motion about the transverse axis is greater than a threshold value.

10. The hand-held power tool as recited in claim 9 wherein the rotary motion sensor is a gyro sensor.

11. The hand-held power tool as recited in claim 9 wherein the rotary motion sensor outputs a measuring signal and the protective device further includes an evaluation unit processing the measuring sensor.

12. The hand-held power tool as recited in claim 9 wherein the protective device triggers the safety function when an instantaneous angular velocity of the hand-held power tool about the working axis exceeds a critical angular velocity.

13. The hand-held power tool as recited in claim 9 wherein the motor includes a brake and the protective device transmits a brake signal to activate the brake when the safety function is triggered.

14. The hand-held power tool as recited in claim 13 wherein the protective device includes a switch, the switch interrupting the transmission of the brake signal when the further rotary or pivoting motion about the transverse axis is greater than the threshold value.

\* \* \* \* \*